Oct. 29, 1929.  A. J. HOWE  1,733,409
CONVEYER MECHANISM
Filed May 3, 1927
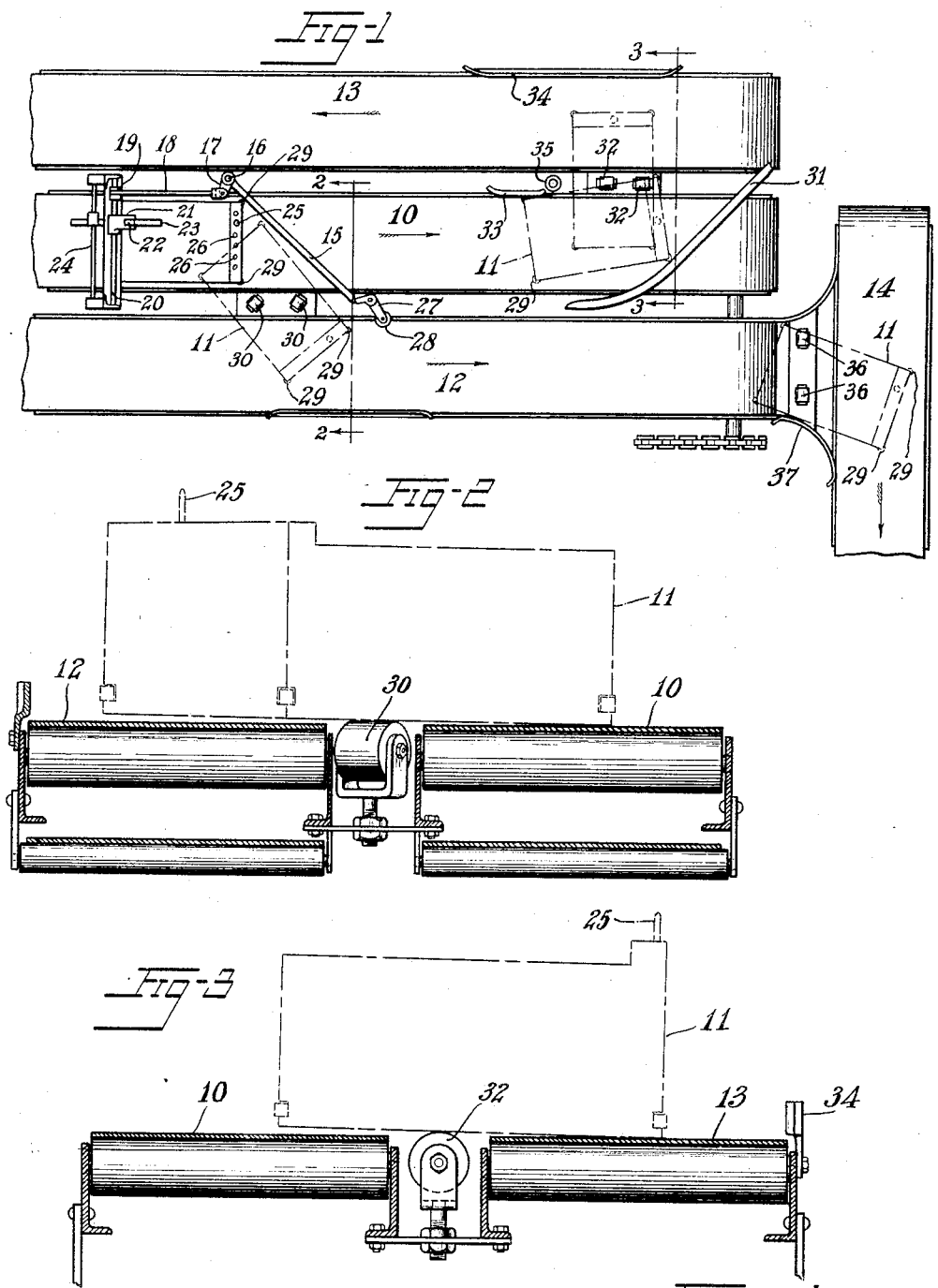
Inventor
Arthur J. Howe
By Pierson, Eakin & Avery
Attys.

Patented Oct. 29, 1929

1,733,409

UNITED STATES PATENT OFFICE

ARTHUR J. HOWE, OF CUYAHOGA FALLS, OHIO, ASSIGNOR TO THE B. F. GOODRICH COMPANY, OF NEW YORK, N. Y., A CORPORATION OF NEW YORK

CONVEYER MECHANISM

Application filed May 3, 1927. Serial No. 188,515.

This invention relates to conveyers and especially to devices for effecting the transfer of a conveyed article from one conveyer to another.

My chief objects are to provide improved mechanism for effecting such transfer of the conveyed article; to provide conveniently for transferring the article from one conveyer to another at the same elevation; to provide for accurate positioning of the article upon the second conveyer; to effect the transfer with small expenditure of power; to provide simple and inexpensive means for effecting the transfer; and to provide transfer means adaptable to conveyers having different relation to each other as to the directions in which they respectively convey the articles.

Of the accompanying drawings:

Fig. 1 is a plan view of conveyer mechanism embodying my invention in three of its numerous possible forms.

Fig. 2 is a section on line 2—2 of Fig. 1.

Fig. 3 is a section on line 3—3 of Fig. 1.

Referring to the drawings, the mechanism here shown comprises an endless belt conveyer 10 with which means is associated for transferring or diverting articles such as work carrying trays 11, 11 from the conveyer 10 onto an endless belt conveyer 12 mounted parallel to and moving in the same direction with the conveyer 10 or onto an endless belt conveyer 13 mounted parallel with the conveyer 10 but moving in the opposite direction. Means also is shown for transferring articles from the conveyer 12 onto an endless belt conveyer 14 moving transversely past the delivery end of the conveyer 12.

All of the carrying reaches of the endless belts may be and preferably are level with each other.

The means for transferring the trays 11 from the conveyer 10 to the conveyer 12 comprises a deflector or diverting arm 15 secured upon and projecting horizontally from a vertical shaft 16 provided with an actuating arm 17 connected by a link 18 with an arm 19 secured upon and rising from a horizontal shaft 20 mounted transversely over the conveyer 10.

The shaft 20 has secured thereon at a determinate position transversely of the carrier an arm 21 connected by a link 22 with a cam arm 23 which is fulcrumed upon a shaft 24 mounted in parallel relation to the shaft 20, the cam arm 23 being adapted to be lifted by a pin 25, mounted selectively in one of a series of holes 26, 26 formed in the top of the frame of the tray 11, as the tray is carried under the arm 23 by the movement of the conveyer 10, the construction being such that lifting of the cam arm 23 by the pin 25 will turn the vertical shaft 16 to swing the diverting arm 15 from a position parallel to and at the side of the conveyer 10 to the oblique, operative position in which it is shown in Fig. 1.

A cam latch device 27 is provided between the conveyers 10 and 12 for automatically engaging the diverting arm 15 and holding it in its oblique, diverting position until the car 11, diverted by the arm from the conveyer 10 to the conveyer 12, engages a cam roller 28 mounted upon one arm of the latch member and causes the latter to release the diverting arm 15 for its return to its inoperative position at the far side of the conveyer 10.

The diverting arm 15 is adapted to be engaged by one of a set of rollers 29, 29 which are journaled upon vertical axes at the respective corners of the tray 11, to slide the front end of the tray on the conveyer 10 toward the conveyer 12. In order to reduce the sliding friction of the tray 11 upon the conveyers in the angular movement incident to its transfer from one conveyer to the other a pair of rollers 30, 30 are journaled on oblique horizontal axes between the two conveyers with their tops slightly above the level of the conveyers and the oblique position of the rollers is such that the movement of their tops, contacting and supporting the tray, will be in a direction diverging, preferably about 3 to 5 degrees, from the adjacent face of the diverting arm 15, so that as soon as the tray has been so deflected by the arm 15 that its front end rides upon one or both of the rollers the latter, because of their angular relation to the diverting arm, will divert the front end of the tray more rapidly toward the conveyer 12 and thus cause it to leave contact with the diverting arm 15, the tray continuing to be driven by line or point contact of its rear end with the conveyer 10 until it is over-balanced upon the rollers 30, being then in approximately the position shown, in the region of the rollers 30, in Fig. 1, at which time the front end of the tilting tray makes point or line contact with the conveyer 12 so that the tray, with its rear end lifted from the conveyer 10, is drawn forward by the conveyer 12 and its rear end is swung over onto the conveyer 12 into proper alignment thereon by reason of the angular position of the rollers 30 over which the tray rides. The tray then proceeds in proper alignment on the conveyer 12, tripping the latch 27 and permitting the diverting arm 15 to return to its inoperative position.

The roller 30 farthest from the diverting arm is preferably so set as to act in a direction slightly more divergent from the diverting arm than that in which the other roller 30 acts, to provide a more rapid diverting of the rear end than of the front end of the tray.

For transferring the trays from the conveyer 10 onto the conveyer 13 I provide a stationarily mounted deflector or diverting rail 31 so positioned obliquely over the conveyer 10 as to crowd the front end of the tray toward the conveyer 13 and between the two conveyers, in position to receive the tray as it is thus crowded, a pair of rollers 32, 32 are mounted on a common axis parallel with the two conveyers and with their tops slightly above the level of the conveyers. The construction is such that as soon as the tray has been so diverted by the deflector 31 as to ride upon the rollers 32 the part of the tray adjacent the rollers lifts out of contact with the conveyer 10 and the rollers rapidly divert the front end of the car while it continues to be driven by line or point contact of its rear end with the conveyer 10 until the tray over-balances on the rollers, thus losing contact with the conveyer 10 and making contact at its front end with conveyer 13. The conveyer 13 then propels the tray in the opposite direction while the rollers 32, because of their angular relation to the tray, swing the rear end of the tray over substantially into alignment on the conveyer 13.

Guide-rails 33, 34 may be provided and a roller 35 may be mounted on a vertical axis at the inside of the turn, to assure proper alignment of the tray, but in actual practice such additional devices are not entirely essential.

The means for transferring the trays from the conveyer 12 to the conveyer 14 consists simply of a pair of rollers 36, 36 journaled between the delivery end of the conveyer 12 and the adjacent side of the conveyer 14, upon a common horizontal axis parallel with the conveyer 14, with their tops slightly above the level of the conveyers. This construction is such that the tray 11, passing from the conveyer 12, over-balances upon the rollers 36 so that its rear end lifts from the conveyer 12 while its front end descends into contact with the conveyer 14, the conveyer 14 then drawing the tray forward by such contact while the rear end of the tray is swung over approximately into alignment on the conveyer 14 by the underlying rollers 36. A guide-rail such as the guide-rail 37 may be employed for perfecting the alignment of the tray upon the conveyer 14.

The construction in each of these forms of the invention is very simple and provides advantages set out in the above statement of objects.

Other forms of the invention may be employed within the scope of the appended claims.

I claim:

1. A conveyer mechanism comprising two conveyers and means for transferring an article from one of the conveyers to the other, the said means comprising a supporting roller journaled on a substantially horizontal axis between the two conveyers and having its top at such an elevation as to cause the article to over-balance thereon in passing from one conveyer to the other.

2. A conveyer mechanism as defined in claim 1 in which the roller is mounted in such position with relation to the conveyers that the article will be so impelled by contact with one of the conveyers in a direction oblique to the axis of the roller as to cause the roller to impart a turning movement to the article.

3. A conveyer mechanism comprising two juxtaposed conveyers, means for driving them in generally opposite directions, and means for transferring an article from one of the conveyers to the other, the said means comprising a roller mounted between the two conveyers on a substantially horizontal axis and having its top at such an elevation as to cause the article to over-balance thereon in passing from one conveyer to the other.

4. A conveyer mechanism comprising two conveyers and means for transferring an article from one of the conveyers to the other, the said means comprising a supporting roller journaled between the two conveyers and having its top at such an elevation as to cause the article to overbalance thereon in passing from one conveyer to the other and a diverting member mounted over one of the conveyers in position to crowd the article laterally thereof onto the roller, the path of the roller's periphery at the top of its orbit being divergent from the face of the diverting member concurrently contacted by the leading part of the article.

In witness whereof I have hereunto set my hand this 30th day of April, 1927.

ARTHUR J. HOWE.